United States Patent
Clark et al.

(10) Patent No.: US 11,626,273 B2
(45) Date of Patent: Apr. 11, 2023

(54) THERMIONIC ENERGY CONVERTER WITH THERMAL CONCENTRATING HOT SHELL

(71) Applicant: Modern Electron, Inc., Bothell, WA (US)

(72) Inventors: Stephen E. Clark, Issaquah, WA (US);
David A. Degtiarov, Seattle, WA (US);
Gregory A. Kirkos, Seattle, WA (US);
Daniel Kraemer, Kirkland, WA (US);
John J. Lorr, Redmond, WA (US);
Max N. Mankin, Seattle, WA (US);
Jason M. Parker, Redmond, WA (US);
Alexander J. Pearse, Seattle, WA (US);
Levi D. Rodriguez, Seattle, WA (US);
Ad de Pijper, Redmond, WA (US)

(73) Assignee: Modern Electron, Inc., Bothell, WA (US)

( * ) Notice: Subject to any disclaimer, the term of this patent is extended or adjusted under 35 U.S.C. 154(b) by 247 days.

(21) Appl. No.: 16/841,327

(22) Filed: Apr. 6, 2020

(65) Prior Publication Data
US 2020/0335314 A1    Oct. 22, 2020

Related U.S. Application Data

(60) Provisional application No. 62/830,027, filed on Apr. 5, 2019.

(51) Int. Cl.
*H01J 45/00* (2006.01)
*H02N 3/00* (2006.01)

(52) U.S. Cl.
CPC .............. *H01J 45/00* (2013.01); *H02N 3/00* (2013.01)

(58) Field of Classification Search
None
See application file for complete search history.

(56) References Cited

U.S. PATENT DOCUMENTS

| | | | |
|---|---|---|---|
| 3,041,481 | A | 6/1962 | Peters et al. |
| 3,052,797 | A | 9/1962 | Kronenberg |
| 3,146,388 | A | 9/1964 | Rasor |
| 3,217,189 | A | 11/1965 | Bloss et al. |

(Continued)

FOREIGN PATENT DOCUMENTS

| | | |
|---|---|---|
| CA | 2544800 A1 | 5/2005 |
| CN | 104501288 A | 4/2015 |

(Continued)

OTHER PUBLICATIONS

Kemenade, Van, H.P.; The Design of a Combustion Heated Thermionic Energy Converter, TU/e Eindhoven University of Technology, Chapters 4-5; 1995; https://doi.org/10.6100/IR438219.

(Continued)

*Primary Examiner* — Ashok Patel
(74) *Attorney, Agent, or Firm* — Perkins Coie LLP (57) ABSTRACT

Various disclosed embodiments include thermionic energy converters with a thermal concentrating hot shell and emitters for thermionic energy converters. In some embodiments, an illustrative thermionic energy converter includes: an emitter electrode; a hot shell configured to concentrate heat flow toward the emitter electrode; a collector electrode; and a cold shell that is thermally isolated from the hot shell.

25 Claims, 7 Drawing Sheets

(56) References Cited

U.S. PATENT DOCUMENTS

| | | | |
|---|---|---|---|
| 3,239,745 | A | 3/1966 | Henqvist |
| 3,254,244 | A | 5/1966 | Milton et al. |
| 3,278,768 | A | 10/1966 | Bernstein |
| 3,297,902 | A | 1/1967 | Beggs |
| 3,388,293 | A | 6/1968 | Petschauer |
| 3,460,524 | A | 8/1969 | Lazaridis |
| 3,515,908 | A | 6/1970 | Caldwell |
| 3,673,440 | A | 6/1972 | Paine et al. |
| 3,694,260 | A | 9/1972 | Beggs |
| 3,702,408 | A | 11/1972 | Longsderff et al. |
| 3,740,592 | A | 6/1973 | Engdahl |
| 4,263,528 | A | 4/1981 | Miram |
| 4,361,781 | A | 11/1982 | Depp et al. |
| 4,373,142 | A | 2/1983 | Morris |
| 4,405,878 | A | 9/1983 | Oliver |
| 4,771,201 | A | 9/1988 | Free |
| 5,219,516 | A | 6/1993 | Horner-Richardson et al. |
| 6,037,697 | A | 3/2000 | Begg et al. |
| 6,181,049 | B1 | 1/2001 | Streckert et al. |
| 6,225,761 | B1 | 5/2001 | Dworsky |
| 6,987,027 | B2 | 1/2006 | Jin |
| 7,969,062 | B2 | 6/2011 | Hagg |
| 8,310,096 | B1 | 11/2012 | Drahota |
| 11,205,564 | B2 | 12/2021 | Clark et al. |
| 2003/0001490 | A1 | 1/2003 | Yamamoto |
| 2004/0261831 | A1 | 12/2004 | Tsuneoka et al. |
| 2005/0016576 | A1 | 1/2005 | Jiang et al. |
| 2005/0162104 | A1 | 7/2005 | Victor |
| 2005/0258729 | A1 | 11/2005 | Han |
| 2005/0285541 | A1 | 12/2005 | LeChevalier |
| 2007/0252507 | A1 | 11/2007 | Jeong |
| 2009/0153015 | A1 | 6/2009 | King |
| 2013/0333749 | A1 | 12/2013 | Adriani |
| 2015/0054398 | A1* | 2/2015 | Yan .................. H01J 1/304 427/126.3 |
| 2015/0243867 | A1 | 8/2015 | Geballe et al. |
| 2015/0270089 | A1 | 9/2015 | Ghanea-Hercock |
| 2018/0294133 | A1 | 10/2018 | Busta |
| 2021/0111011 | A1 | 4/2021 | Clark |

FOREIGN PATENT DOCUMENTS

| | | |
|---|---|---|
| CN | 204421172 U | 6/2015 |
| DE | 102004018631 A1 | 11/2004 |
| EP | 0068111 | 11/1985 |
| JP | 0823688 A | 1/1996 |
| RU | 2594279 C1 | 8/2016 |
| WO | 2013/152613 A1 | 10/2013 |
| WO | WO-2020185613 | 9/2020 |

OTHER PUBLICATIONS

Rasor Associates, Inc.; Thermionic Cogeneration Burner Assessment Study Performance Analysis Results, Topical Report, Technical Information Center, Office of Scientific and Technical Information, United States Department of Energy, Dec. 1983, Sunnyvale,CA; https://www.osti.gov/servlets/purl/5046814.

Rasor Associates, Inc., Thermionic Cogeneration Burner Assessment; International Atomic Energy Agency; 1984, vol. 17, Issue 1; https://inis.iaea.org/search/searchsinglerecord.aspx?recordsFor=SingleRecord&RN=17000943.

Miskolezy, G.; Design and Economic Evaluation of Thermionic Cogeneration in a Chlorine-Caustic Plant, Oaktrust, Texas A&M University Libraries; https://oaktrust.library.tamu.edu/handle/1969.1/93395,1985.

Klepikov, V.V. et al; Design of a TECTEM Prototype; https://dol.org/10.4271/929357,1992.

Miskolczy, G. et al.; Design and Construction of Thermionic Cogeneration Burner Module; International Atomic Energy Agency; 1984, vol. 16, Issue 20; https://inis.iaea.org/search/search.aspx2orig q=RN:16069698.

International Search Report and Written Opinion for International Patent Application No. PCT/US20/26913, Applicant: Modern Electron, Inc., dated Jul. 1, 2020, 11 pages.

Baksht et al., "Thermionic Converters and Low-Temperature Plasma," Technical Information Center/U.S. Department of Energy, 1978, 92 pages.

Extended European Search Report for European Patent Application No. 20784624.7, Applicant: Modern Electron, Inc., dated Dec. 2, 2022, 9 pages.

McDonald, "A Study of the possibility of transferring electricity in a thermionic energy converter by a electron attaching gas," Thesis, Department of Nuclear Engineering, University of Arizona, 1966, 72 pages.

N.S. Rasor, "Thermionic Energy Conversion Plasmas," IEEE Transactions on Plasma Science, vol. 19, No. 6, Dec. 1999, 17 pages.

Rasor Associates, Inc., "Advanced Thermionic Energy Conversion: Progress Report," NSR 2-3, COO-2263-3, Sep. 1, 1974, Aug. 31, 1975, 176 pages.

* cited by examiner

THERMIONIC ENERGY CONVERTER WITH THERMAL CONCENTRATING HOT SHELL

RELATED APPLICATION

The present application claims the benefit of priority of filing from U.S. Provisional Patent Application Ser. No. 62/830,027, filed Apr. 5, 2019, and entitled "Thermionic Energy Converter With Thermal Concentrating Emitter," the entire contents of which are incorporated by reference.

TECHNICAL FIELD

The present disclosure relates to thermionic energy converters.

BACKGROUND

Thermionic energy conversion is the direct production of electrical power from heat by thermionic electron emission. A thermionic energy converter ("TEC") includes a hot emitter electrode which thermionically emits electrons over a potential energy barrier and through an inter-electrode plasma to a cooler collector electrode, thereby producing a useful electrical power output.

Resulting electrical current from known TECs, typically on the order of around several amperes per square centimeter of emitter surface, delivers electrical power to a load at a typical potential difference of 0.5 volt-1 volt and a typical thermal efficiency of around 5%-20%, depending on the emitter temperature (1500 K-2000 K) and mode of operation.

However, competing design factors of thermal isolation between the hot and cold side of the TEC, mechanical integrity of the hot shell under thermal cycling, current carrying capability of the hot shell wall, and machinability of the structure are at tension with each other and may limit efforts to optimize electrical power output and thermal efficiency of currently-known TECs.

SUMMARY

Various disclosed embodiments include thermionic energy converters with a thermal concentrating hot shell and emitters for thermionic energy converters.

In various embodiments, an illustrative thermionic energy converter includes: an emitter electrode; a hot shell configured to concentrate heat flow toward the emitter electrode; a collector electrode; and a cold shell that is thermally isolated from the hot shell.

In other embodiments, another illustrative thermionic energy converter includes: an emitter electrode; a hot shell configured to concentrate heat flow toward the emitter electrode; a collector electrode; a cold shell that is thermally isolated from the hot shell; an electrical isolator configured to electrically isolate the collector electrode from the emitter electrode; a positive electrical terminal electrically connected to the collector electrode; and a negative electrical terminal electrically connected to the emitter electrode.

In other embodiments, an emitter for a thermionic energy converter includes: an emitter electrode; and a hot shell configured to concentrate heat flow toward the emitter electrode.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

By way of overview, various disclosed embodiments include thermionic energy converters with a thermal concentrating hot shell and emitters for thermionic energy converters.

Still by way of overview and referring to FIGS. 1, 2, 3A, 3B, and 4, in various embodiments an illustrative thermionic energy converter ("TEC") 10 includes an emitter electrode 12. A hot shell 14 is configured to concentrate heat flow 15 (FIG. 3B) toward the emitter electrode 12. A collector electrode 16 is provided. A cold shell 18 is thermally isolated from the hot shell 14.

Now that an overview has been provided, details will be explained by way examples provided by way of illustration only and not of limitation.

Still referring to FIGS. 1, 2, 3A, 3B, and 4, in various embodiments the thermal concentrating hot shell 14 is configured (such as being shaped) to concentrate the heat flow 15 toward the emitter electrode 12 while thermally isolating the emitter electrode 12 and the hot shell 14 from the collecting side of the TEC 10 (that is, the collector electrode 16 and the cold shell 18). In some such embodiments the emitter electrode 12 has, without limitation, a hemispherical vacuum-facing surface. It will be appreciated that in such embodiments the shape or geometry of the emitter electrode 12 can help provide increased power output per cross-sectional area compared to a flat (for example, circular or cylindrical) emitter surface. While a simple, hemispherically-shaped geometry is shown, it will be appreciated that other, more complex shapes could be used that can help contribute to providing even higher amounts of surface area within a given enclosed volume as desired for a particular application.

In various embodiments, the hot shell 14 may have a tapered shell wall design that allows heat to be concentrated on the hot, emitter side of the TEC 10 and isolated from the cold, collector side of the TEC 10. In some such embodiments the hot shell 14 has a wall thickness that tapers from a thickness $T_1$ (FIG. 2) at an end 20 to a thickness $T_2$ (FIG. 2) at an end 22 that is distal the emitter electrode 12. In such embodiments, the thickness $T_2$ is less than the thickness $T_1$. In various embodiments, wall thicknesses, lengths, and/or shape of the hot shell 14 may be selected in a manner to help balance, trade off, and seek to optimize competing design factors of thermal isolation between the hot and cold side of the TEC 10, mechanical integrity of the hot shell 14 under thermal cycling, current carrying capability of the wall of the hot shell 14, and machinability of the structure of the TEC 10.

In some embodiments the emitter electrode 12 may be made with electron emissive material such as a refractory metal, a refractory alloy, and/or a superalloy. In some such embodiments, the refractory metal and/or the refractory alloy may include materials such as, without limitation, molybdenum, tungsten, niobium, kanthal, Haynes 214, and/or a metallized ceramic. In some other such embodiments the superalloy may include materials such as FeCrCl and/or Kanthal APM. It will be appreciated that superalloys can act as electron emitters—albeit typically not as good as pure refractory metals and/or refractory alloys. It will also be appreciated that superalloys also are prone to evaporation—which may, in some instances, affect work function of the surface of the collector electrode 16.

In some embodiments the hot shell 14 may be made with a structural material and the emitter electrode 12 may include a coating of electron-emitting material on a vacuum-facing (that is, interior) surface of the hot shell 14. In some such embodiments the structural material of the hot shell 14 may include a material such steel, a superalloy, SiC, alumina, kanthal, haynes alloys, stainless, sibor, inconel, zro2, hastelloy, rene, CMCs, MMC, cermet, TiN, and/or the like. In some such embodiments the electron-emitting material of the emitter electrode 12 may include a material such as a refractory metal, a refractory alloy, a superalloy (all of which have been discussed above), and/or a mixture of a refractory metal, a refractory alloy, or a superalloy with other materials to enhance electron emission, such as without limitation barium, calcium, thorium, strontium, barium oxide, calcium oxide, thorium oxide, strontium oxide, lanthanum, lanthanum oxide, scandium oxide, vanadium oxide, a boride of lanthanum, cerium, cerium oxide, a boride of cerium, scandium, vanadium, and/or carbon.

In various embodiments, the collector electrode 16 may include a collector rod. In some such embodiments, the collector rod may be made with a material such as without limitation copper, stainless steel, steel, nickel, a refractory metal, metalized ceramic, or the like. In such embodiments the collector rod may be surrounded by a collector brazing sleeve which is used to facilitate assembly via brazing of components of the TEC 10. The brazing sleeve can be made from, without limitation, Kovar, OFE Copper 101, Stainless Steel (SST), Monel, Tungsten, Cupro-Nickel, Titanium, Aluminum, or other suitable materials.

In some embodiments the collector rod may include an alignment-and-gap-setting feature 24 (FIG. 2) that is configured to set a gap between the vacuum-facing surface of the emitter electrode 12 and a vacuum-facing surface of the collector electrode 16. In such embodiments the alignment and gap setting feature 24 sets the gap between surfaces of the emitter electrode 12 and the collector electrode 16 when the assembly is brazed together. It will be appreciated that thermal expansion of metal components may contribute to further changes in the gap and may contribute to isolating the alignment and gap setting feature 24 from the vacuum-facing surface of the emitter electrode 12. Gap widths can be in a range of tens of microns to hundreds of microns depending upon properties of the emitter electrode 12 and the collector electrode 16 and the gas or vapor mixture in the gap.

In various embodiments an electrical isolator 26 (FIG. 2) is configured to electrically isolate the collector electrode 16 from the emitter electrode 12. In some such embodiments the electrical isolator 26 may include a ceramic breaker ring. In some such embodiments the ceramic breaker ring may be made from alumina, silicon nitride, silicon carbide, or other suitable high temperature ceramic material as desired for a particular application.

In various embodiments a port 28 (FIG. 2) is configured to evacuate the thermionic energy converter. In some such embodiments the port 28 may be further configured to fill the thermionic energy converter with material selected to increase electron emission of the emitter electrode 12 and lower work function of the collector electrode 16. For example, in some such embodiments a metal tube, made from a nickel-cobalt ferrous alloy (such as Kovar) or other suitable material, is used to provide the port 28 for evacuating the TEC 10 and for dosing the TEC 10 with Cs or CsOx to enhance the performance of the TEC 10 via increasing the electron emission of the surface of the emitter electrode 12 and by lowering the work function of the collector electrode 16.

In various embodiments a heat exchanger (or heat sink) 30 is disposed in thermal communication with the cold shell 18 at an end of the cold shell 18 that is distal the emitter electrode 12. In such embodiments the heat exchanger 28 terminates at the end of the collector rod to pull heat away from the TEC 10 and thereby forming an extended heat sink. In some such embodiments the heat exchanger 30 may include fins or other structures 32 (FIGS. 3A and 3B).

Figure 1:
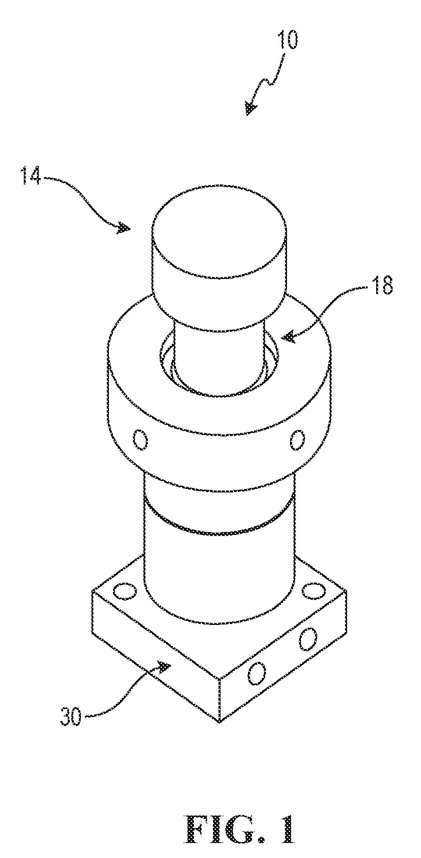
FIG. 1 is a perspective view of an illustrative thermionic energy converter.
Figure 2:
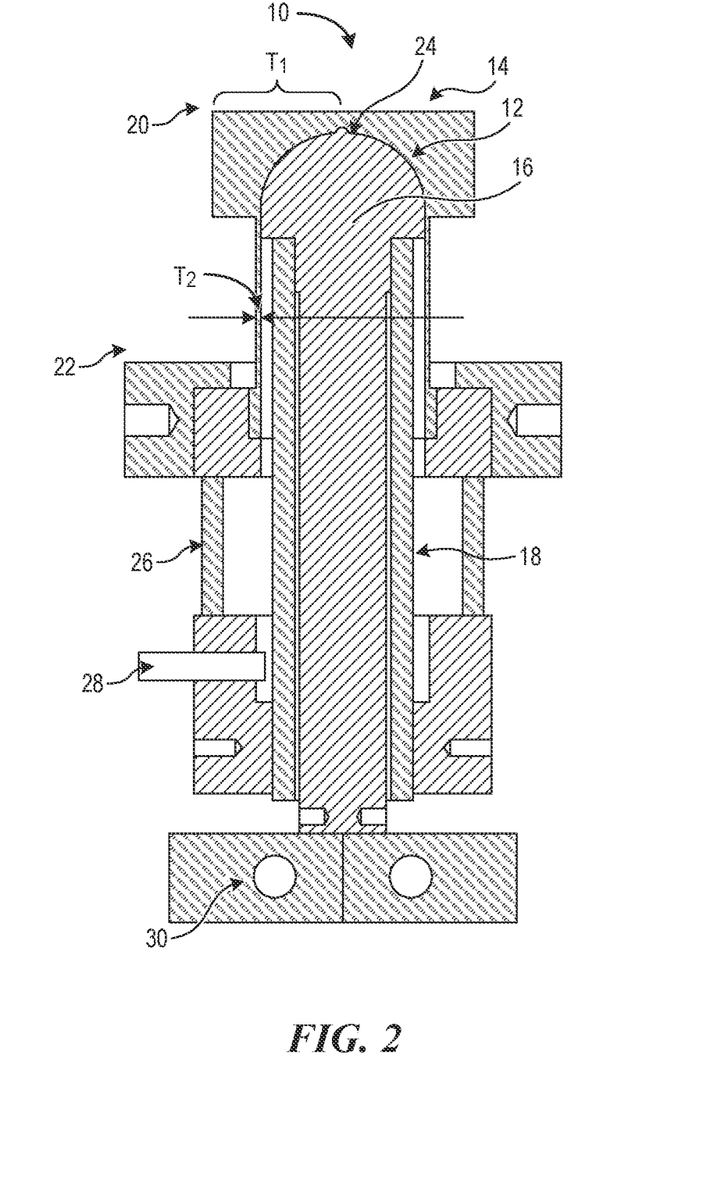
FIG. 2 is a side plan view in cutaway of the thermionic energy converter of FIG. 1.
Figures 3A, 3B, 4:
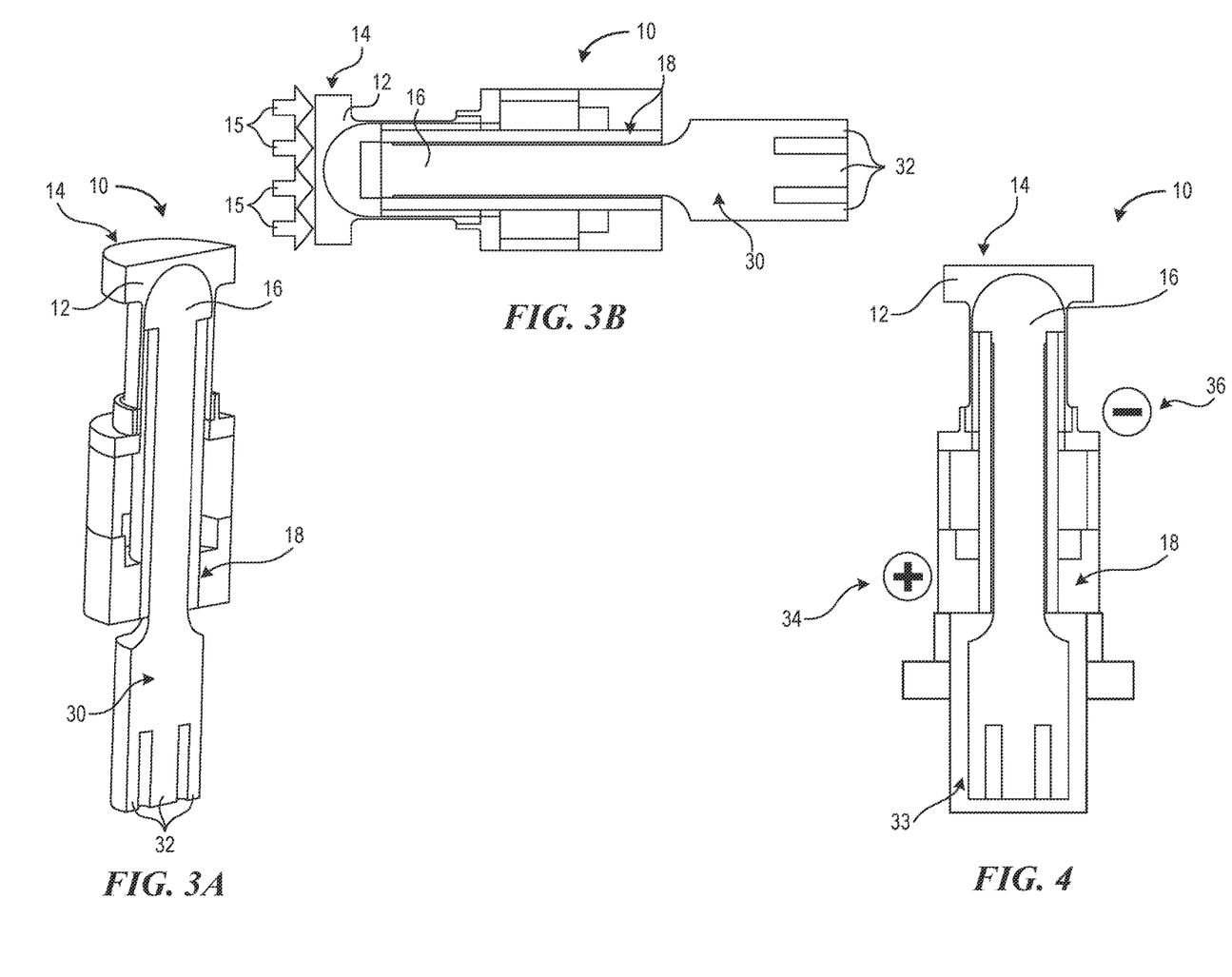
FIG. 3A is a perspective view in cutaway of the thermionic energy converter of FIG. 1.
FIG. 3B is another side plan view in cutaway of the thermionic energy converter of FIG. 1.
FIG. 4 is a side plan view in cutaway showing details regarding electrical connections in the thermionic energy converter of FIG. 1.

In various embodiments and as shown in FIG. 4, a thermal interface material 33 (electrically insulating or conducting) with appropriate thermal conductivity may be used to transfer heat at a desired amount from the cold shell 18 to the heat exchanger 30. The thermal interface material 33 may also be a piece of material (such as without limitation copper or other highly thermally conductive metals, thermally conductive metal alloys, thermally conductive ceramic, or the like). In some embodiments a heat pipe may also be used. The heat pipe could be filled with a fluid, a mixture of fluids (water and glycol, for instance, or organic fluids like methanol or ethanol or napthalene), or a metal (cesium, potassium, sodium, mercury, or a mixture thereof). The inside wall of the heat pipe may be grooved, or covered with a mesh, wire, screen, or a sintered material, as desired. The cold shell 18 may also include divots or other machined shapes to conform closely to the heat exchanger 30 or accommodate the form factor of the heat exchanger 30 for mechanical stability, for better thermal contact, or for optimizing transfer of heat from the cold shell 18 to the heat exchanger 30. A thermal grease (such as without limitation metal like silver paste, organic, or graphite) may be used to enhance thermal contact between the cold shell 18 and the heat exchanger 30.

In various embodiments the TEC 10 may suitably be integrated into existing space in, around, or between burner sections of gas heaters and a heat exchanger. For example, in some such embodiments the heat exchanger 28 suitably may terminate into a heat exchanger of a gas furnace (not shown) or to walls of a water tank or boiler (not shown). When provided, the fins or other structures 32 may directly transfer heat to fluid or air (such as water in a boiler or air in a furnace).

As shown in FIG. 4, in various embodiments appropriate electrical contacts are attached to the TEC 10. For example, a positive electrical terminal 34 is electrically connected to the collector electrode 16 and a negative electrical terminal 36 is electrically connected to the emitter electrode 12. In some such embodiments, the negative electrical terminal 36 is electrically connected to the emitter electrode 12 at an isothermal temperature point between the hot shell 14 and the cold shell 18. By doing so, heat transfer can be reduced (with a goal of seeking to be minimized) between neighboring series cells (sometimes referred to as "lead loss") in series cell TECs.

In various embodiments, the leads between the cells of a series cell TEC can be fashioned from suitable high temperature/heavy gauge wires or mineral insulated cables. In some embodiments, pure metal bus bars may also be used if desired. The type of leads and connects between cells may be determined in part by the current carrying requirements between the cells and between groups of cells connected in series-parallel arrangements. The temperature at the various contact points may also be considered as well as the cost of various lead materials.

In various embodiments the non vacuum-facing surface of the hot shell 14 may be coated with a coating selected to reduce $NO_x$ emission. In such embodiments a coating is added to the surface of the non vacuum-facing surface of the hot shell 14 that could help reduce $NO_x$ emission by breaking down the $NO_x$ into $N_2$ and $O_2$. As is known, many metal coatings and composite metals are known to provide catalytic properties toward $NO_x$ breakdown. For instance, selective or non-selective catalytic reduction of $NO_x$ and/or sorption-type materials may be used as desired for a particular application.

Figure 5:
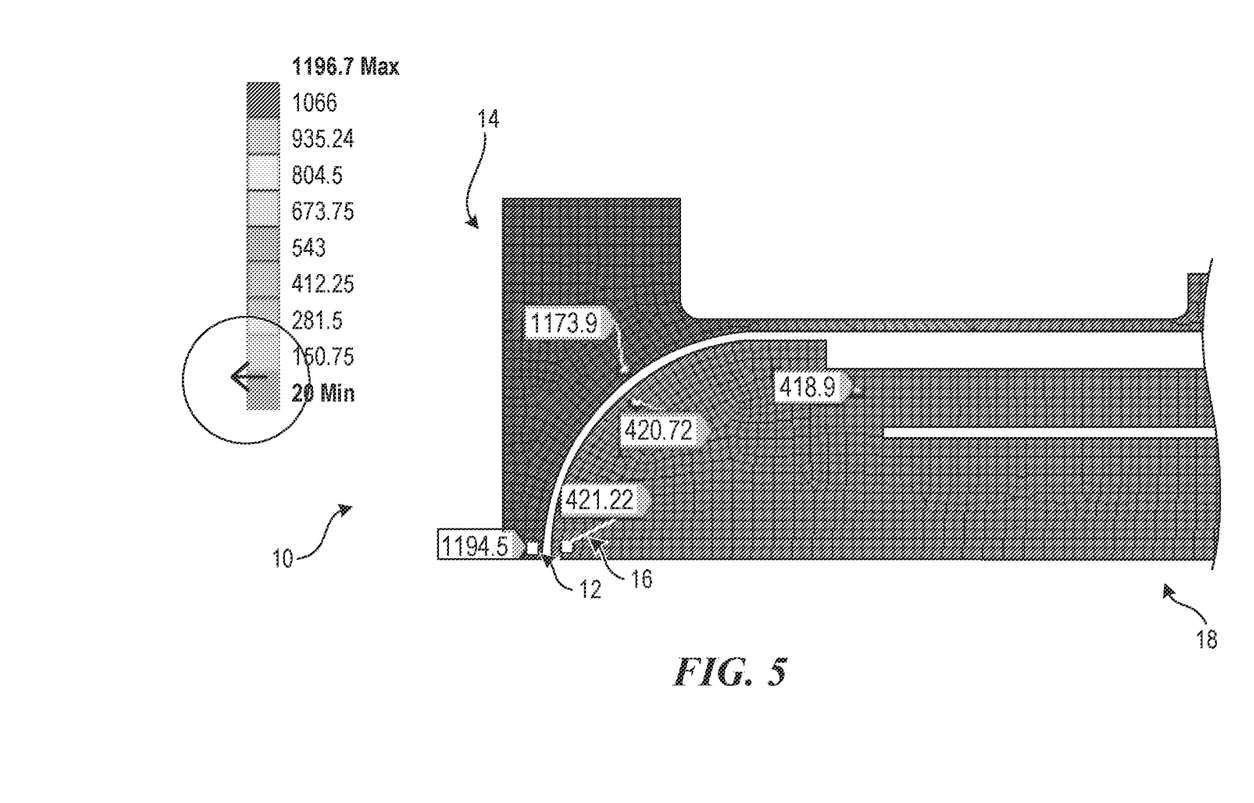
FIG. 5 illustrates thermal modeling of the thermionic energy converter of FIG. 1.

Referring additionally to FIG. 5, thermal analysis shows thermal concentration properties of an illustrative TEC 10. As shown in FIG. 5, in various embodiments heat is concentrated near the hemispherical vacuum-facing surface of the emitter electrode 12.

To improve heat transfer into the TEC 10, in various embodiments geometry of the hot shell 14 can be designed to increase convective and radiative heat transfer. Referring additionally to FIGS. 6, 7, 8A, 8B, 9, and 10, in various embodiments the hot shell 14 may include a heat transfer enhancement feature. Given by way of non-limiting examples, the heat transfer enhancement feature may include pins 38 (FIG. 6), grooves 40 that are defined in a non-vacuum-facing surface of the hot shell 14 (FIG. 7), at least one extension 42 (FIGS. 8A, 8B, and 9), and a faceted geometry FIG. 10) defined in the non-vacuum-facing surface of the hot shell 14.

Figure 6:
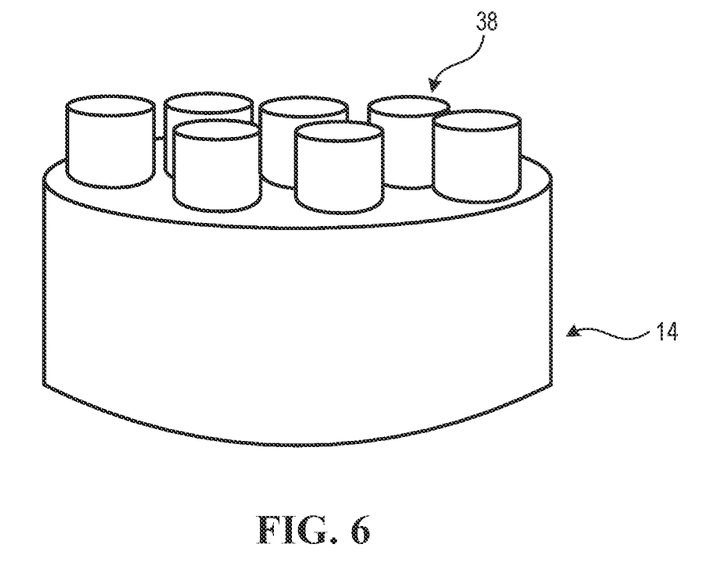
FIGS. 6, 7, 8A, 8B, 9, and 10 illustrate heat transfer enhancement features.

As shown in FIG. 6, in some embodiments a bank of pins 38 may be placed on the hot shell 14 to increase the convection area. In such embodiments the pins 38 can help to improve heat transfer to the TEC 10 from a heat source (such as a flame from burning fuel).

Figure 7:
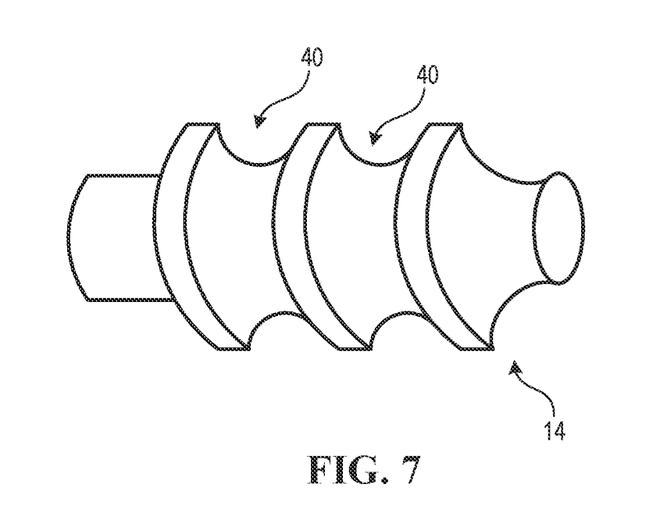

As shown in FIG. 7, in some embodiments circumferential features or grooves 40 may be defined in a non-vacuum-facing surface of the hot shell 14. In such embodiments the grooves 40 can help to enhance convective heat transfer aligned with the flow of heated air or combustion gases with less pressure drop through the system.

Figure 8A:
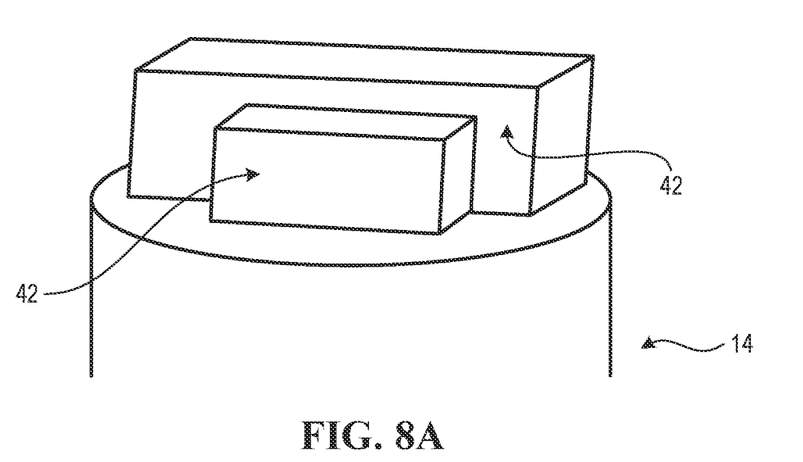
Figure 8B:
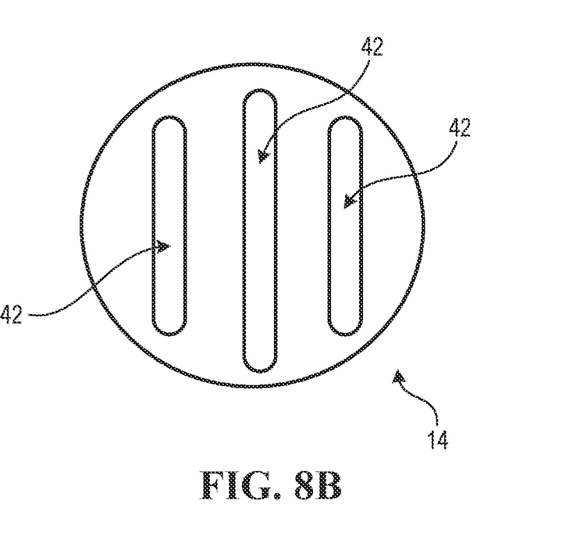

As shown in FIGS. 8A and 8B, in some embodiments fins or extensions 42 may be aligned with the flow heat air of flame gases. In such embodiments the extensions 42 can help to increase heat transfer while maintaining low pressure drop through the system.

Figure 9:
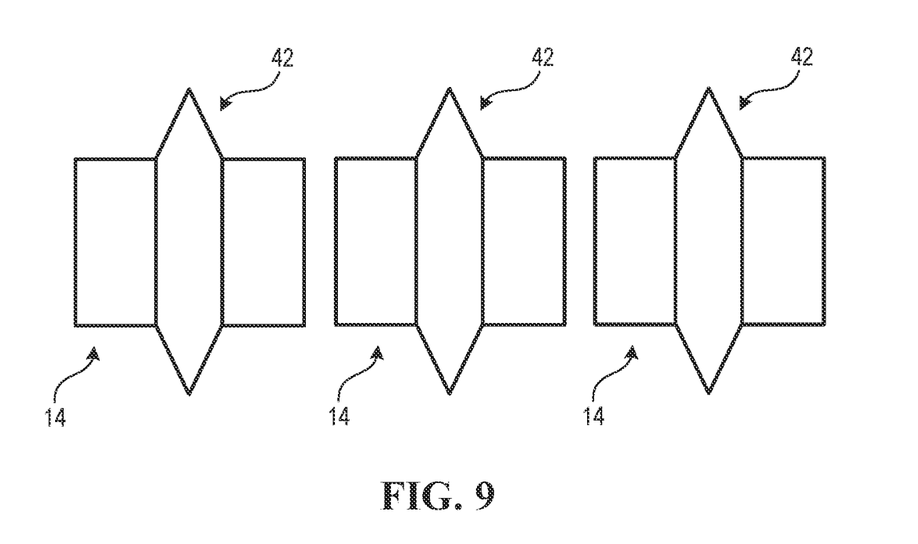

As shown in FIG. 9, in some embodiments the extensions 42 from the hot shell 14 can form passages for increased velocity and heat transfer TECs 10 are assembled in an array of multiple TECs 10 that is placed in the heat flow from burning gas.

Figure 10:
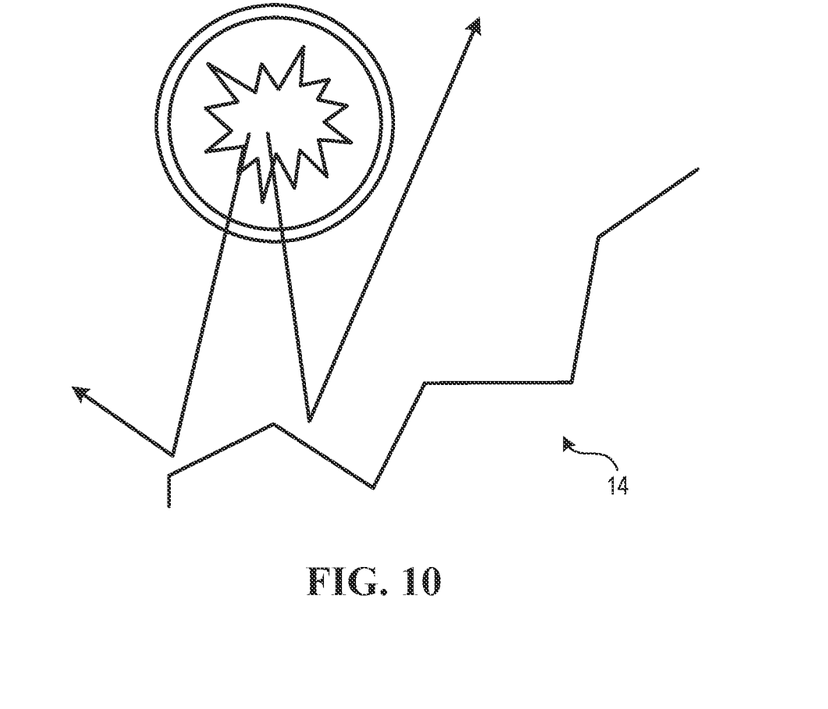

As shown in FIG. 10, in some embodiments the hot shell 14 may define a faceted geometry to reflect re-radiation to other TECs 10 and to help avoid the burner. This feature can help reduce radiation losses of the hot shell 14 and can help contribute to improving burner life.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A thermionic energy converter comprising:
   an emitter electrode having an emitter electrode surface;
   a hot shell thermally coupled to the emitter electrode, wherein, in operation, a distal end portion of the hot shell faces toward and absorbs heat from a heat source; and
   a collector electrode having a collector electrode surface, wherein—
      the distal end portion of the hot shell is distal to the emitter electrode along a first axis,
      the emitter electrode is distal to the collector electrode along the first axis,
      the collector electrode surface and emitter electrode surface define a gap such that, in operation electrons are emitted across the gap from the emitter electrode surface toward the collector electrode surface in a proximal direction, opposite the distal direction, along the first axis,
      a cross section of the collector electrode, taken along a second axis normal to the first axis, has a first cross-sectional area, and
      the emitter electrode surface exposed to the vacuum gap has a second surface area greater than the first cross-sectional area of the collector electrode.

2. The thermionic energy converter of claim 1, wherein the emitter electrode surface has a hemispherical shape.

3. The thermionic energy converter of claim 1, wherein the hot shell has a wall thickness that tapers from a first thickness at the distal end portion to a second thickness at a proximal end portion opposite the distal end portion, the second thickness being less than the first thickness.

4. The thermionic energy converter of claim 1, wherein the emitter electrode comprises a refractory metal, a refractory alloy, and/or a superalloy.

5. The thermionic energy converter of claim 1, wherein:
   the hot shell includes a structural material; and
   the emitter electrode includes a coating of electron-emitting material on the emitter electrode surface.

6. The thermionic energy converter of claim 1, wherein the collector electrode includes a collector rod.

7. The thermionic energy converter of claim 6, wherein the collector rod includes an alignment-and-gap-setting feature configured to set a gap between the vacuum-facing surface of the emitter electrode and a vacuum-facing surface of the collector electrode.

8. The thermionic energy converter of claim 1, further comprising:
a cold shell thermally isolated from the hot shell; and
a heat exchanger disposed to be in thermal communication with the cold shell at an end of the cold shell.

9. The thermionic energy converter of claim 1, wherein the distal end portion of the hot shell includes a heat transfer enhancement feature.

10. The thermionic energy converter of claim 9, wherein the heat transfer enhancement feature includes a plurality of pins, a plurality of grooves, a plurality of fins, at least one extension, and/or a faceted geometry.

11. The thermionic energy converter of claim 1, further comprising:
a positive electrical terminal electrically connected to the collector electrode; and
a negative electrical terminal electrically connected to the emitter electrode.

12. The thermionic energy converter of claim 11, wherein the negative electrical terminal is electrically connected to the emitter electrode at an isothermal temperature point between the hot shell and the cold shell.

13. The thermionic energy converter of claim 1, wherein the emitter electrode surface has a first radial dimension and the collector electrode has a second radial dimension smaller than the first radial dimension.

14. The thermionic energy converter of claim 1, wherein the emitter electrode surface has a concave shape and/or the collector electrode surface has a convex shape.

15. The thermionic energy converter of claim 1, wherein the emitter electrode forms an integral portion of the hot shell.

16. The thermionic energy converter of claim 1, wherein the first cross-sectional area of the collector electrode is a maximum cross-sectional area of the collector electrode.

17. A thermionic energy converter comprising:
an emitter electrode having an emitter electrode surface;
a hot shell thermally coupled to the emitter electrode and distal to the emitter electrode along a first axis, wherein—
the hot shell includes a distal end portion and an opposing proximal end portion,
in operation, the distal end portion faces toward and absorbs heat from a heat source and the proximal end portion is adjacent the emitter electrode, and
the hot shell is tapered such that the distal end portion has a first thickness and the proximal end portion has a second thickness less than the first thickness; and
a collector electrode having a collector electrode surface, wherein—
the collector electrode surface and emitter electrode surface define a gap,
in operation, electrons are emitted across the gap from the emitter electrode surface toward the collector electrode surface in a proximal direction,
a cross section of the collector electrode, taken along a second axis normal to the first axis, has a first area, and
the emitter electrode surface exposed to the vacuum gap has a second surface area greater than the first area.

18. The thermionic energy converter of claim 17, wherein the emitter electrode surface has a hemispherical shape.

19. The thermionic energy converter of claim 17, wherein the emitter electrode comprises a refractory metal, a refractory alloy, and/or a superalloy.

20. The thermionic energy converter of claim 17, wherein:
the hot shell includes a structural material; and
the emitter electrode includes a coating of electron-emitting material on the emitter electrode surface.

21. The thermionic energy converter of claim 17, further comprising:
a cold shell thermally isolated from the hot shell; and
a heat exchanger disposed to be in thermal communication with the cold shell at an end of the cold shell.

22. The thermionic energy converter of claim 17, wherein the distal end portion of the hot shell includes a heat transfer enhancement feature.

23. The thermionic energy converter of claim 22, wherein the heat transfer enhancement feature includes a plurality of pins, a plurality of grooves, a plurality of fins, at least one extension, and/or a faceted.

24. The thermionic energy converter of claim 17, wherein the collector electrode surface is curved and has a third surface area exposed to the gap less than the second surface area of the emitter electrode surface exposed to the gap.

25. A thermionic energy converter comprising:
a hot shell comprising an emitter electrode surface, wherein—
the hot shell includes a distal end portion and an opposing proximal end portion,
in operation, the distal end portion faces toward and absorbs heat from a heat source and the emitter electrode surface is at the proximal end portion, and
the hot shell is tapered such that the distal end portion has a first thickness and the proximal end portion has a second thickness less than the first thickness; and
a collector electrode having a collector electrode surface, wherein—
the hot shell is distal to the collector electrode along a first axis,
the collector electrode surface and emitter electrode surface define a gap,
in operation, electrons are emitted across the gap from the emitter electrode surface toward the collector electrode surface in a proximal direction,
a cross section of the collector electrode, taken along a second axis normal to the first axis, has a first area, and
the emitter electrode surface exposed to the vacuum gap has a second surface area greater than the first area.

* * * * *

UNITED STATES PATENT AND TRADEMARK OFFICE
CERTIFICATE OF CORRECTION

PATENT NO. : 11,626,273 B2
APPLICATION NO. : 16/841327
DATED : April 11, 2023
INVENTOR(S) : Stephen E. Clark et al.

It is certified that error appears in the above-identified patent and that said Letters Patent is hereby corrected as shown below:

On the Title Page

On the Page 2, in Column 2, Item (56) under "Other Publications", Line 18, delete "aspx2orig" and insert -- aspx?orig --.

In the Specification

In Column 3, Line 39, delete "zro2," and insert -- ZrO2, --.
In Column 4, Line 53, delete "napthalene)," and insert -- naphthalene), --.
In Column 5, Line 55, delete "FIG." and insert -- (FIG. --.

In the Claims

In Column 8, Line 25, in Claim 23, delete "faceted." and insert -- faceted geometry. --.

Signed and Sealed this
Eighth Day of August, 2023

Katherine Kelly Vidal
*Director of the United States Patent and Trademark Office*